INVENTOR
JOHN SHIELDS
ATTORNEYS

United States Patent Office 3,552,864
Patented Jan. 5, 1971

3,552,864
LIQUID RECEIVING CELLS FOR ANALYTICAL INSTRUMENTS
John Shields, Newcastle-upon-Tyne, England, assignor to Sir Howard Grubb Parsons & Company Limited, Newcastle-upon-Tyne, England, a British company
Filed Nov. 21, 1967, Ser. No. 684,827
Claims priority, application Great Britain, Dec. 19, 1966, 56,779
Int. Cl. G01n 1/10
U.S. Cl. 356—246        4 Claims

ABSTRACT OF THE DISCLOSURE

A cell for receiving liquid for use in analytical instruments of the kind in which the property of a liquid to absorb radiation is made use of to determine the composition of the liquid, comprising two windows of material transparent to the radiation to be used and, located in spaced relation to define a space therebetween for the flow of liquid to be analysed, and means defining a groove on the surface bounding the space of at least one of said windows to thereby provide an additional path for the said flow of liquid between inlet and outlet means.

---

This invention relates to liquid receiving cells for use in analytical instruments of the kind in which the property of a liquid to absorb radiation is made use of to determine the composition of the liquid.

A sample of liquid flowing through such a cell can be analysed continuously by passing radiation of a selected wavelength or wavelengths through the cell. Such cells usually comprise an assembly of two windows of transparent material separated by a spacer, the assembly being contained in a housing provided with an inlet and an outlet for the liquid. The radiation is passed through the cell whilst liquid is flowing therethrough, and by measuring the absorption of radiation by the liquid at one or more wavelengths, the composition of the liquid can be deduced. A typical instrument of this kind is the infra-red milk analyser or spectrophotometer.

So as not to impede the radiation directed through the windows, it is normal practice to form the inlet and outlet in the side of the container, the liquid entering an inlet adjacent one window and leaving via an outlet adjacent the other window. With highly absorbent liquids, a very short radiation path length through the cell is necessary and this can mean that the spacing between the windows can be as little as 10 microns. In such cells the resistance to liquid flow offered by the cell is considerable, and there is a tendency for the liquid to leak around the peripheral face of the window unless a good seal is effected between the peripheral face and the housing, or sealing ring within the housing. As a result, the sample liquid flowing across the cell, in the space between the windows, changes extremely slowly and in some instances the maintenance of a steady flow through the space between the windows is difficult. Some difficulty of this nature may be experienced with some liquids when the spacing between the windows is less than say $100\mu$.

According to the present invention, a cell for receiving liquid for use in analytical instruments of the kind described in the first paragraph hereof, comprises two windows of material transparent to the radiation to be used, located in spaced relation to define a space therebetween for the passage of liquid to be analysed, and inlet and outlet means for conveying liquid to and removing it from said space, at least one of said windows having a groove formed in its surface bounding the space for the passage of liquid to provide an additional path for flow of liquid between said inlet and outlet means.

The invention also consists in a cell in accordance with the preceding paragraph, in which at least one of the windows has a pair of straight grooves formed thereon, the grooves being spaced apart by a distance sufficient to provide an unimpeded passage for radiation passing through the cell.

The invention also consists in a cell in accordance with either of the preceding two paragraphs, in which one window is stepped to form a boss on the face bounding the space for the passage of liquid and a spacer separates the two windows and surrounds the boss, said spacer having an inlet and outlet opening formed therein and the face of said boss having one or more grooves formed thereon.

The invention also consists in a cell substantially as described herein with reference to the accompanying drawings in which.

Figure 1:
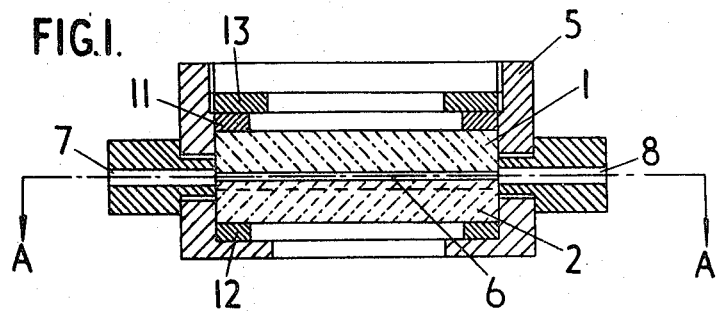
FIG. 1 is a section through an absorption cell in accordance with one embodiment of the invention.
Figure 2:
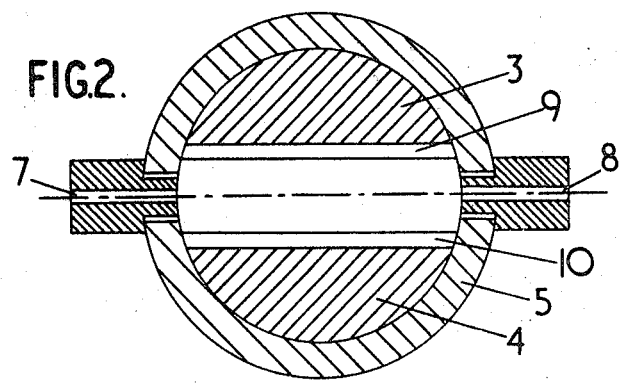
FIG. 2 is a sectional plan on line A—A of FIG. 1.

In carrying the invention into effect in the forms illustrated by way of example, FIGS. 1 and 2 show an absorption cell comprising two circular windows 1 and 2 supported in spaced relation by spacers 3 and 4 within a cylindrical housing 5. The windows 1 and 2 define between them a space 6 forming a passage for the flow of liquid through the cell from an inlet 7 in housing 5 to an outlet 8 therein. The face of window 2 bounding the space 6 has a pair of grooves 9 and 10 formed therein as can be seen in FIG. 2. In the form shown, the grooves are straight and substantially parallel but this is not essential. They could be curved, or staright but not parallel. In some instances one groove may suffice.

The grooves 9 and 10 provide additional paths for the liquid passing through inlet 7 and the liquid flowing through the grooves assists the flow of fluid through the space 6.

The groovve shape is not critical but conveniently is semi-circular in cross-section. A typical groove size for a cell having windows 25 millimetres diameter, is 0.5 mm. wide and 0.25 mm. deep, but would vary according to viscosity of the liquid or flow rate required. The groove separation could be 5 mm. Such a cell would be suitable for use in an infra-red spectrophotometer. In such an application, the cell is usually placed in front of the entrance slit of a monochromator or at a primary focus in the instrument and the area bounded by the grooves and the edges of the windows, being 25 mm. by 5 mm. in the example quoted, would be adequate to allow unimpeded passage of radiation.

The spacers 3 and 4 may be made of metal or tough plastic material and the windows may be supported in housing 5 by means of resilient washers 11 and 12.

The upper window 1 may be held in position by member 13 screwed into the housing 5. It can also be used to exert a force holding the windows and spacing washers 3 and 4 in sealing relationship to prevent leakage of liquid. The windows should also be a close fit in the housing or sealing ring within the housing to prevent leakage of liquid past the peripheral edges of the windows and the housing 5.

If the thickness of the space 6 between the windows is of the order of 30 microns, which might be necessary for the analysis of an aqueous sample such as milk using infra-red radiation, the greater part of the flow is through the grooves but this carries adjacent parts of the body of the liquid with it through the space 6.

Figure 3:
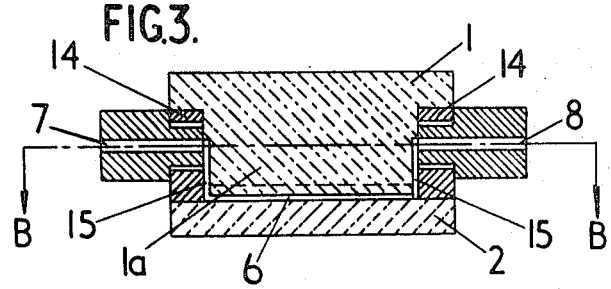
FIG. 3 is a section through an absorption cell in accordance with an alternative embodiment of the invention.
Figure 4:
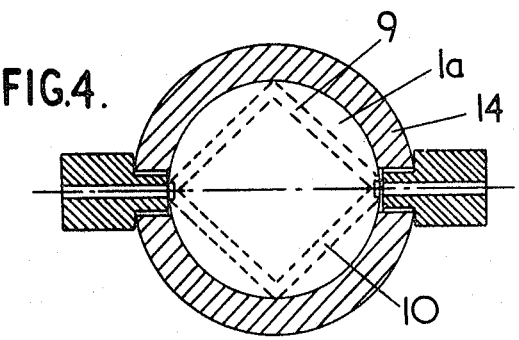
FIG. 4 is a sectional plan view on line B—B of FIG. 3.

In an alternative construction shown in FIGS. 3 and 4, one of the windows, window 1 in the form shown, has a central boss 1a on its face bounding the space 6, said boss being circular and preferably integral with the window. The grooves are formed on the face of boss 1a as shown dotted in FIG. 4. In FIG. 4, each of the grooves 9 and 10 forms an angled path for the liquid as shown. The provision of boss 1a enables the spacer 14 to be made in one piece instead of two pieces as in the arrangement of FIGS. 1 and 2. The spacer 14 carries the inlet and outlet tubes and a separate housing 5 can be dispensed with if desired, provided that the parts 1, 2 and 14 are cemented together.

The thickness of the spacer 14 is such that window 2 is spaced from window 1 to define space 6 for the flow of liquid.

When aqueous media are being analysed, it is necessary to use material for the windows 1 and 2 which resists attack by said media. For the wavelength region 1–9µ calcuim fluoride is satisfactory, but it is brittle and difficulties may be encountered in forming a groove in the material. A material known as Irtran 3 which is a trade name for a special crystalline form of calcium fluoride, has been found to be more suitable in some instances.

Whilst in the forms described the grooves may be formed in one window only, a groovve or grooves may be formed in both windows if desired.

I claim:

1. A cell for receiving liquid for use in analytical instruments of the kind in which the property of a liquid to absorb radiation is made use of to determine the composition of the liquid, comprising two windows of material transparent to the radiation to be used, means locating the said windows in spaced relation to define a space therebetween for the passage of liquid to be analysed, inlet means and outlet means coupled in fluid-flow relationship to said space for feeding liquid to and removing it from the said space, and means defining a groove on the surface bounding the space of at least one of said windows and extending from the inlet means to the outlet means to thereby provide an additional path for the flow of liquid between said inlet and outlet means.

2. A cell according to claim 1, in which at least one of the windows has means defining a pair of spaced apart straight grooves, the grooves being spaced by a distance sufficient to provide an unimpeded passage for radiation passing through the cell.

3. A cell according to claim 1, in which one window is stepped to define a boss on the face bounding the space for the passage of liquid, and the cell further comprising a spacer separating the two windows and surrounding the boss, said spacer having an inlet and an outlet opening formed therein, and the face of said boss having at least one groove formed therein.

4. A cell according to claim 3, wherein each groove forms an angled path for the liquid.

References Cited

UNITED STATES PATENTS

| | | | |
|---|---|---|---|
| 2,015,949 | 10/1935 | Maw | 356—246 |
| 2,048,128 | 7/1936 | Logan | 356—246 |
| 2,056,791 | 10/1936 | Logan | 356—246 |
| 2,062,587 | 12/1936 | Logan et al. | 356—246 |
| 2,819,402 | 1/1958 | Watson et al. | 356—246X |
| 3,177,756 | 4/1965 | Williams et al. | 356—246 |
| 3,363,503 | 1/1968 | Shifrin | 356—246 |
| 3,391,598 | 7/1968 | DeGrave et al. | 356—246 |

RONALD L. WIBERT, Primary Examiner

W. A. SKLAR, Assistant Examiner